United States Patent [19]
Nakano et al.

[11] Patent Number: 5,496,614
[45] Date of Patent: Mar. 5, 1996

[54] MAGNETIC RECORDING MEDIUM

[75] Inventors: Yasushi Nakano, Hino; Setsuko Kawahara, Hinode; Yuji Shimizu; Tohru Miyake, both of Hachioji, all of Japan

[73] Assignee: Konica Corporation, Tokyo, Japan

[21] Appl. No.: 358,629

[22] Filed: Dec. 14, 1994

Related U.S. Application Data

[63] Continuation of Ser. No. 934,903, Aug. 26, 1992, abandoned, which is a continuation of Ser. No. 580,570, Sep. 11, 1990, abandoned.

[30] Foreign Application Priority Data

Sep. 14, 1989 [JP] Japan ................................. 1-239181

[51] Int. Cl.⁶ ............................ B32B 3/10; B32B 27/30; G11B 5/66
[52] U.S. Cl. ..................... 428/141; 428/522; 428/694 B; 428/694 BC; 428/694 BR; 428/694 BA; 428/694 BM; 428/694 BG; 428/694 BP; 428/694 SG; 428/900
[58] Field of Search ..................... 428/141, 522, 428/900, 694 B, 694 BC, 694 BR, 694 BA, 694 BM, 694 BG, 694 BP, 694 SG

[56] References Cited

U.S. PATENT DOCUMENTS

| 3,953,656 | 4/1976 | Tokuoka et al. | 428/694 |
| 4,513,054 | 4/1985 | Kitamoto et al. | 428/900 |
| 4,670,319 | 6/1987 | Katoh et al. | 428/480 |
| 4,910,068 | 3/1990 | Takagi et al. | 428/900 |

*Primary Examiner*—Leszek Kiliman
*Attorney, Agent, or Firm*—Finnegan, Henderson, Farabow, Garrett & Dunner

[57] ABSTRACT

A magnetic recording medium is disclosed. The recording medium comprises a non-magnetic support and a plurality of magnetic layers being provided on a surface of the support, wherein one of the plural magnetic layers comprises a magnetic material comprising a magnetite iron oxide in which the ratio of divalent iron component $Fe^{2+}$ to a trivalent iron component $Fe^{3+}$ is $$0.13 \leq Fe^{2+}/Fe^{3+} \leq 0.45$$

in atomic number ratio;

the other magnetic layers each comprises a magnetic material other than the magnetite iron oxide; and the non-magnetic support has from 100,000/mm² to 4,000,000/mm² of protuberances on its surface opposite to the surface on which the magnetic layers are provided.

9 Claims, 2 Drawing Sheets

MAGNETIC RECORDING MEDIUM

This application is a continuation of application Ser. No. 07/934,903, filed Aug. 26, 1992, now abandoned, which is a continuation of application Ser. No. 07/580,570, filed Sep. 11, 1990, abandoned.

FIELD OF THE INVENTION

The present invention relates to a magnetic recording medium such as a magnetic tape, a magnetic sheet or a magnetic disk.

BACKGROUND OF THE INVENTION

Magnetic recording media such as magnetic tapes are commonly prepared by applying to a support a magnetic coating composition comprising a magnetic powder, a binder resin and so forth, followed by drying. In conventional magnetic recording media, only one magnetic layer is used, and hence a wide frequency band ranging from a low band to a high band must be covered using one kind of magnetic powder. In particular, in the recent tendency toward higher recording density, it is required to provide a magnetic recording medium improved in recording characteristics at a higher band and yet having a low noise, and hence a magnetic powder with a high Hc and a high BET value is used.

However, because of the magnetic recording medium comprised of one kind of magnetic powder (or magnetic layer), too much account of high-band characteristics is made to avoid using a magnetic powder of a high Hc and high BET value, resulting in insufficient characteristics at low bands.

On one hand, in magnetic recording media used for video tapes, proposals have been made on a medium having a plurality of magnetic layers so that magnetic recording capacity can be enhanced, or magnetic recording characteristics at both the high-frequency bands and low-frequency bands of a medium can be improved and balanced (see Japanese Patent Publications Open to Public Inspection (hereinafter referred to as Japanese Patent O.P.I. Publication) No. 98803/1973 and No. 172142/1984, Japanese Patent Examined Publication No. 2218/1957, Japanese Patent O.P.I. Publication No. 64901/1976, Japanese Patent Examined Publication No. 12937/1981, and Japanese Patent O.P.I. Publications No. 56228/1983 and No. 146221/1988, etc.)

According to these known techniques, a magnetic recording medium comprises magnetic layers comprised of an upper layer in which a magnetic powder with relatively fine particles is used and a lower layer in which a magnetic powder with larger particles than that, and are so designed that the upper layer serves video outputs and the lower layer serves chroma-audio outputs.

On the other hand, Japanese Patent O.P.I. Publication No. 61230/1986 discloses a magnetic recording medium comprising a magnetic layer containing a magnetic powder comprising Co-containing $\gamma$-Fe$_2$O$_3$ which contains a divalent iron component (Fe$^{2+}$) in an amount of from 3.5 to 10% by weight in terms of FeO and from 0.04 to 0.123 in terms of Fe$^{2+}$/Fe$^{3+}$. Japanese Patent O.P.I. Publications No. 19524/1989, No. 86321/1989, No. 13225/1989 and No. 300425/1988 also disclose that FeO$_x$ (where $1.33 \leq x \leq 1.50$) is used as a magnetic powder.

As a magnetic powder, a Co-containing iron oxide comprising Fe$^{2+}$ of as much as Fe$^{2+}$/Fe$^{3+}$=0.13 to 0.45, compared with Co-containing $\gamma$-Fe$_2$O$_3$ comprising Fe$^{2+}$ in a proportion of Fe$^{2+}$/Fe$^{3+}$=0.001 to 0.1, is called a magnetite type (Fe$_3$O$_4$), and is comprised of FeO and Fe$_2$O$_3$. Such a magnetite type Co-containing iron oxide commonly has superior properties such that it is black in color and superior in light-shading properties, and hence the amount of carbon black to be added in a medium can be reduced, can readily make exchange of electrons between Fe$^{2+}$ and Fe$^{3+}$ to lower surface specific resistance of a magnetic layer, and yet shows a coercive force (Hc) with a value which is advantageous for chroma outputs.

However, employment of the Co-containing iron oxide of a magnetite type results in an increase in the proportion of FeO, and hence the properties of the surfaces of magnetic powder particles turn electron-donative to cause changes of adsorption behavior at the time of dispersion. This causes deterioration of dispersibility and tends to result in a lowering of electromagnetic conversion characteristics. This may also cause an increase in the adsorption of a fatty acid to a magnetic material, so that the fatty acid that may exude to the surface of a medium can be controlled with difficulty. This tends to cause faulty travel, or contamination of a calender roll at the time of manufacture.

SUMMARY OF THE INVENTION

An object of the present invention is, in a magnetic recording medium comprised of a plurality of magnetic layers, to improve travel performance, to prevent calender roll contamination or the like and also to maintain electromagnetic conversion characteristics, making the most of the characteristic features of the magnetic material of a magnetite type.

The above object of the present invention can be achieved by a magnetic recording medium comprising a non-magnetic support and a plurality of magnetic layers provided on a surface of the support, wherein one of the plural magnetic layers comprises a magnetic material comprising a magnetite type iron oxide in which the ratio of a divalent iron component Fe$^{2+}$ to a trivalent iron component Fe$^{3+}$ is $$0.13 \leq Fe^{2+}/Fe^{3+} \leq 0.45$$

in atomic number ratio;

the other magnetic layers each comprise a magnetic material other than the magnetite type iron oxide; and the non-magnetic support has from 100,000/mm$^2$ to 4,000,000/mm$^2$ of protuberances on its surface opposite to the surface on which the magnetic layers are provided.

DETAILED DESCRIPTION OF THE INVENTION

Figure 1:
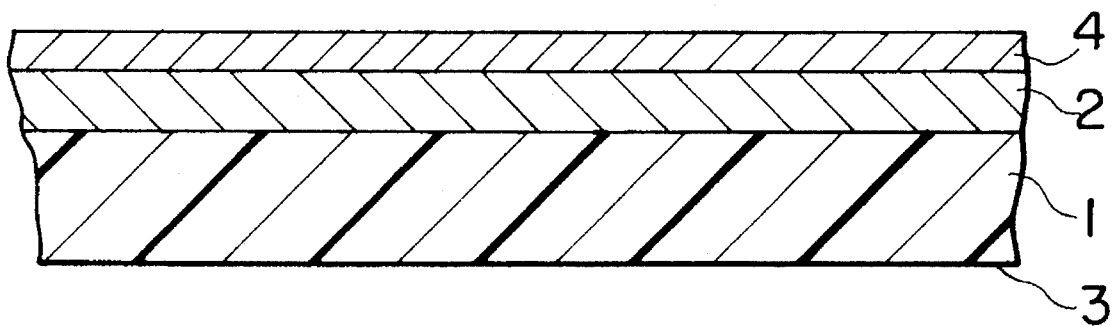
FIGS. 1 and 2 cross-sectionally illustrate two examples of the magnetic recording medium of the present invention.

According to the present invention, the magnetic material contained in at least one lower layer or an uppermost layer of a plurality of magnetic layers is comprised of an iron oxide of a magnetite type, i.e., $0.13 \leq Fe^{2+}/Fe^{3+} \leq 0.45$, and hence the magnetic layer itself has sufficient light-shading properties, in addition, has a lower surface specific resistance. Thus, it is possible to reduce the amount of carbon black to be added in the component layers of a medium, or to add no carbon black. For example, since the amount of carbon black to be added to magnetic layers can be reduced, electromagnetic conversion characteristics can be improved, and also it becomes unnecessary to control the amount of carbon black in a back coat layer, which has been hitherto necessary to do so in order to impart light-shading properties to a medium. It becomes even possible to omit the back coat layer itself. In the case when no back coat layer is thus provided, travel performance of a medium becomes poor. In the present invention, however, the protuberances provided on the non-magnetic support at its surface opposite to the side on which magnetic layers are formed (i.e., the back surface) are as many as $100,000/mm^2$ to $4,000,000/mm^2$ as described above, which are much more than those in a conventional magnetic recording medium. Hence, the coefficient of friction on the back surface of the support becomes smaller even if no back coat layer is provided, and the runnability of a medium against a guide or the like can be very much improved. As a result, even if the employment of the above magnetic material of a magnetite type has brought about a lowering of the runnability at the magnetic layer side, the protuberances provided on the back surface in the number described above can impart to the medium the runnability good enough to compensate such a possible lowering thereof. This can be made more effective when the magnetic material of a magnetite type is added only to a lower layer among the magnetic layers, and an iron oxide of $Fe^{2+}/Fe^{3+}=0.001$ to $0.1$ is used in the uppermost layer, since the runnability on the magnetic layer side can also be improved.

In the present invention the iron oxide magnetic material of a magnetite type is contained not in the whole magnetic layers but in the lower layer or uppermost layer thereof, and hence the layer in which a magnetic material other than the magnetic material of a magnetite type is used has good surface properties with good dispersibility. Thus, it is possible to maintain electromagnetic conversion characteristics of a medium. In this instance, the surface on the magnetic layer side of the above non-magnetic support may be kept smooth, so that the uppermost layer of the magnetic layers becomes relatively flat and hence the electromagnetic conversion characteristics can be improved. In addition, the use of a magnetic material other than the magnetic material of a magnetite type makes it possible to control the exudation of a fatty acid by controlling its amount, so that the contamination of calender rolls can be prevented at the time of manufacture.

In the present invention, the magnetic material of a magnetite type comprises $Fe^{2+}$ preferably in a proportion of $0.20 \leq Fe^{2+}/Fe^{3+} \leq 0.41$, and more preferably $0.25 \leq Fe^{2+}/Fe^{3+} \leq 0.38$. The protuberances on the back surface of the non-magnetic support may preferably be from $150,000/mm^2$ to $3,000,000/mm^2$, and more preferably from $150,000/mm^2$ to $1,000,000/mm^2$. The protuberances may have an average height of preferably from 10 to 300 nm, and more preferably from 20 to 200 nm. The number of the protuberances herein referred to is the number per 1 mm² of protuberances of not less than 0.01 μm from the line of an areal percentage of 70% of the load curve, as measured using a surface roughness meter ET30K, manufactured by Kosaka Co.

As a method of controlling the proportion of $Fe^{2+}$ in the magnetic material of a magnetite type, the proportion of $Fe^{2+}$ can be varied by varying the baking temperature and time at the stage an oxide is produced, thereby controlling oxidation.

Of the magnetic layers in the present invention, the uppermost layer may have a thickness of preferably from 0.1 to 1.0 μm, and more preferably from 0.1 to 0.5 μm. The lower layer beneath this uppermost layer should have a layer thickness of from 1.5 to 4.0 μm, and more preferably from 1.5 to 3.0 μm.

The support of the present invention, having protuberances on its back surface, can be prepared by adding to the support itself a filler comprised of non-magnetic particles having appropriate size and form, or laminating on the back surface of a usual support containing no filler a protuberance-forming layer containing non-magnetic particles. The non-magnetic particles may preferably be those having a particle diameter as uniform as possible and also having substantially a spherical shape. Such non-magnetic particles may be added to the support or the protuberance-forming layer in an amount of from 0.1 to 10 % by weight, and preferably from 0.1 to 5% by weight. The non-magnetic particles preferably used include aluminum silicate, calcium phosphate and silica. Calcined aluminum silicate includes, for example, calcined clay. Hydrated aluminum silicate includes, for example, agaltmatolite, kaolinite, kaolin and clay. Silica may be either crystalline or non-crystalline.

In the case when the support and the protuberance-forming layer are formed of a polyester, the non-magnetic particles may be added before the polymerization of a polyester or in the course of the polymerization. Alternatively, they may be kneaded in an extruder when pelletized after completion of the polymerization. Still alternatively, they may be added when the polyester is melt-extruded in a sheet so that they are dispersed in an extruder and then extruded. It is preferred to add them before the polymerization.

In order to laminate the protuberance-forming layer on the support, it is possible to use conventional methods for the preparation of laminated films. For example, a polyester containing the non-magnetic particles and a polyester that forms the surface may be laminated in a molten state or a solidified-by-cooling state. It is also possible to make films by co-extrusion or by extrusion coating.

The films laminated by the above method are subjected to successive biaxial orientation or simultaneous biaxial orientation according to usual methods for preparing biaxially oriented films. In that instance, the surface properties of films vary depending on the form, particle diameter, amount or the like of the non-magnetic particles added, and hence conditions for the orientation may be appropriately selected. The protuberance-forming layer may preferably have a thickness of from 0.01 to 2 μm on the average.

In the present invention, the plural layers, i.e., the uppermost layer and the lower layer, that constitute the magnetic layers should be adjacent to each other. In some instances, a boundary region where magnetic powders of both the layers are mixed is present in a given thickness, except when a clear boundary is substantially present between the layers. The above each layer is meant to be an upper or lower layer excluding such a boundary region. In particular, the magnetic recording medium of the present invention is suitable when each magnetic layer is formed by wet-on-wet coating. Of course, the wet-on-dry coating may also be used in which an upper layer is coated after a lower layer has been dried.

The magnetic recording medium of the present invention comprises, for example, as shown in FIG. 1, a non-magnetic support 1 comprising polyethylene terephthalate or the like, and a first magnetic layer 2 and a second magnetic layer 4 which are laminated in this order. No back coat layer is provided on the support surface on the side opposite to the surface 3 on which these magnetic layers are provided, and instead the corresponding support surface is uniformly provided with 100,000/mm$^2$ to 4,000,000/mm$^2$ of protuberances in accordance with the present invention. An over coat layer may be provided on the second magnetic layer. In the example shown in FIG. 2, the upper layer is further divided into layers 5 and 6.

Figure 2:
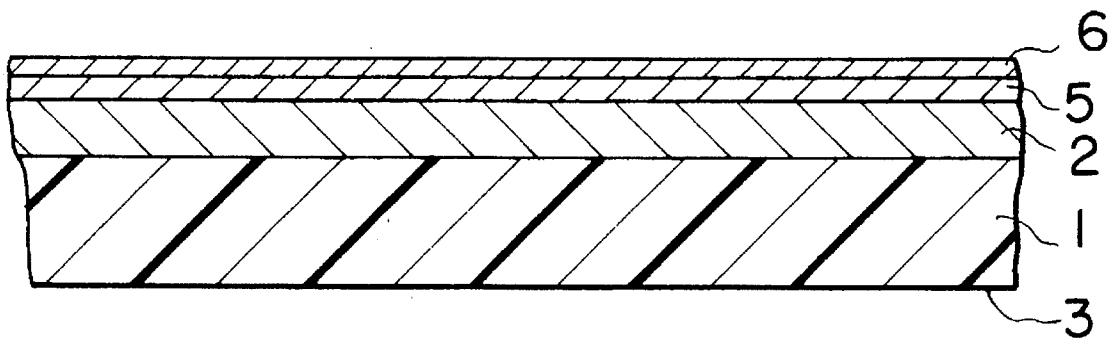

In the magnetic recording media shown in FIGS. 1 and 2, the first magnetic layer 2 may preferably have a layer thickness of from 1.5 to 4.0 μm, for example, 3.0 μm. The layer thickness of the second magnetic layer 4 or the total layer thickness of the second and third magnetic layers 5 and 6 should be not more than 1.0 μm, for example, 0.5 μm.

Magnetic powders are contained in the magnetic layers 2, 4, 5 and 6. The magnetic powder used in one of the magnetic layers 2 and 4 or one of the magnetic layers 5, 2 and 6 comprises the magnetic material of a magnetite type according to the present invention, as exemplified by Co-containing $Fe_3O_4$ ($Fe^{2+}/Fe^{3+}$=0.13 to 0.45). The magnetic powder used in other layers includes iron oxide magnetic powder such as γ-$Fe_2O_3$, or Co-containing γ-$Fe_2O_3$; and ferromagnetic powder of various types such as Fe, Ni, Co, and metal magnetic powder mainly composed of Fe, Ni, and Co, as exemplified by an Fe—Ni—Co alloy, an Fe—Ni alloy, an Fe—Al alloy, an Fe—Ni—Ni alloy, an Fe—Al—Co alloy, an Fe—Mn—Zn alloy, an Fe—Ni—Zn alloy, an Fe—Al—Ni—Co alloy, an Fe—Al—Ni—Cr alloy, an Fe—Al—Co—Cr alloy, an Fe—Co—Ni—Cr alloy, an Fe—Co—Ni—P alloy or a Co—Ni alloy. In respect of the magnetic layers 4 and 6 on the outermost surface and other magnetic layers 2 and 5, the former 4 or 5 is made to serve as the uppermost layer, and the latter layers 2 and 5, as the lower layers.

Magnetic powders suitable for the above respective magnetic layers can be selected from these magnetic powders.

A lubricant as exemplified by silicone oil, graphite, molybdenum disulfide, tungsten disulfide, a monobasic fatty acid having 12 to 20 carbon atoms, e.g., stearic acid, or a fatty acid ester having 13 to 40 carbon atoms in total, an abrasive as exemplified by molten alumina, an antistatic agent as exemplified by carbon black or graphite, and a dispersing agent as exemplified by lecithin may also be added to the magnetic layer.

Binders usable in the magnetic layers may include those having an average molecular weight of from about 10,000 to about 200,000. They include, for example, a vinyl chloride/vinyl acetate copolymer, a vinyl chloride/vinylidene chloride copolymer, a vinyl chloride/acrylonitrile copolymer, polyvinyl chloride, urethane resins, a butadiene/acrylonitrile copolymer, polyamide resins, polyvinyl butyral, cellulose derivatives such as cellulose acetate butyrate, cellulose diacetate, cellulose triacetate, cellulose propionate and nitrocellulose, a styrene/butadiene copolymer, polyester resins, all sorts of synthetic rubber, phenol resins, epoxy resins, urea resins, melamine resins, phenoxy resins, silicone resins, acrylic reactive resins, a mixture of a high-molecular polyester resin with an isocyanate prepolymer, a mixture of a polyester polyol with polyisocyanate, urea formaldehyde resins, a mixture of a low-molecular glycol/a high-molecular diol/isocyanate, and mixtures of some of these.

These binders should preferably be resins containing a hydrophilic polar group such as —$SO_3M$, —COOM OR —$PO(OM')_2$, wherein M is hydrogen or an alkali metal such as lithium, potassium or sodium; and M' is an alkali metal such as lithium, potassium or sodium, or a hydrocarbon residual group. Such resins can improve compatibility with magnetic powder because of the polar group in the molecule, can thereby further improve the dispersibility of the magnetic powder, and also can prevent agglomeration of the magnetic powder to more improve coating solution stability, and besides can improve the durability of mediums.

Such binders, in particular, the vinyl chloride copolymer, can be obtained by copolymerizing vinyl chloride monomers, copolymerizable monomers containing an alkali salt of sulfonic acid or phosphoric acid, and optionally other copolymerizable monomers. The resulting copolymer can be synthesized with ease since it is obtained by a vinyl synthesis, and also copolymer components can be selected from various monomers, so that properties of a copolymer can be controlled in an optimum state.

The metal of the above salt of sulfonic acid or phosphoric acid is an alkali metal, in particular, sodium, potassium or lithium. Potassium is particularly preferred in view of its solubility, reactivity, yield, etc.

As materials for the above support 1, used are plastics such as polyethylene terephthalate and polypropylene, metals such as Al and Zn, ceramics such as glass, BN (boron nitride), silicon carbide, porcelain and earthenware.

Figure 3:
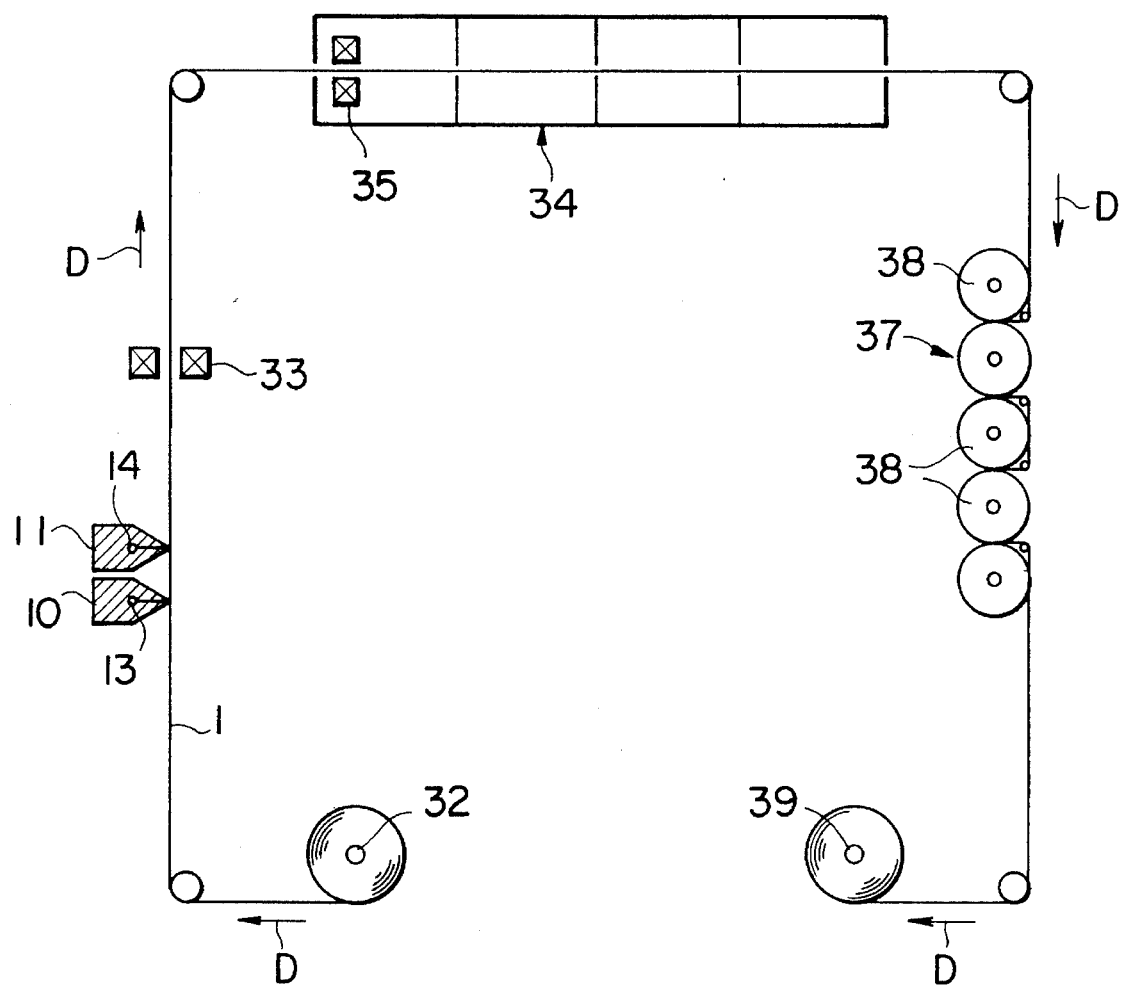
FIG. 3 schematically illustrates an apparatus for manufacturing the magnetic recording medium of the present invention.

An example of an apparatus for manufacturing the above magnetic recording medium is illustrated in FIG. 3.

In this manufacturing apparatus, the magnetic recording medium shown in FIG. 1 is prepared in the following manner: First, a film-like support 1 delivered from a feed roll 32 is coated with coating compositions for the above magnetic layers 2 and 4 by means of extrusion coaters 10 and 11, respectively. Thereafter, the film-like support coated with magnetic layers is oriented using a pre-stage orientation magnet 33 of, for example, 2,000 Gauss, and is further guided into a dryer 34 provided with a post-stage orientation magnet 35 of, for example, 2,000 Gauss, where hot wind is blown from nozzles provided above and below the film-like support and thus the coating layers are dried. Next, the support 1 with dried coating layers is led to a super calendering equipment comprising a combination with calender rolls 38, calendered therein, and then wound up on a wind-up roll 39. The respective coating compositions may be fed to the extrusion coaters 10 and 11 through an in-line mixer (not shown). In FIG. 3, an arrow D indicates the direction in which the non-magnetic base film is transported. The extrusion coaters 10 and 11 are provided with liquid reservoirs 13 and 14, respectively. The coating compositions fed from the respective coaters are superposingly applied by the wet-on-wet method. In order to make the magnetic recording medium shown in FIG. 2, another extrusion coater may be added to the extrusion coaters shown in FIG. 3.

EXAMPLES

In the following examples, "part(s)" or "pbw" refers to part(s) by weight in all instances.

First, the materials as shown in Table 1 below were kneaded and dispersed using a kneader and a sand mill to prepare magnetic coating compositions for the respective layers. Next, on a polyethylene terephthalate base film of 14.5 μm thick, magnetic coating compositions for the respective lower layers and a magnetic coating composition for the upper layer were successively coated using the apparatus as shown in FIG. 3, followed by orientation, drying, and then calendering. As the base film, polyethylene terephthalate films varied in the number of protuberances were used as shown in Table 1.

In Table 1 below, each binder is specifically as follows:

Polyvinyl chloride resin (PVG) "MR110":
 A solution of vinyl chloride resin containing potassium sulfonate, produced by Nippon Zeon Co., Ltd., solid content: 30 wt. %; solvent: methyl ethyl ketone.

Polyurethane "UR8300":
 A solution of polyester polyurethane containing sodium sulfonate, produced by Toyobo Co., Ltd.; solid content 30 wt. %; solvent: methyl ethyl ketone= 1:1.

Polyisocyanate "Colonate L":
 A solution of polyisocyanate produced by Nippon Polyurethane Industry Co., Ltd.; solid content: 50 wt. %; solvent: methyl ethyl ketone.

The above solid content is expressed by the following equation:

$$\text{Solid content} = \frac{\text{weight of resin}}{\text{weight of resin} + \text{weight of solvent}} \times 100\%$$

The following performances were evaluated on the tapes thus prepared. Results obtained are shown in Table 1.

(1) RF output:
 100% White signals were recorded and reproduced to measure output levels.

(2) Chroma output:
 100% Color signals were recorded and reproduced to measure output levels.

(3) Runnability:
 Tapes were repeatedly recorded and reproduced 200 times under conditions of room temperature and normal humidity. Output differences between RF output at the first time and RF output after 200 times are indicated in dB units. The mark "+" means that the RF output after 200 times is larger than the RF output at the first-time reproduction.

(4) Calendar roll contamination:
 In the above tape manufacture process, the state of contamination of calender rolls used in calendering was visually observed, and results were evaluated on the bases of the following five grades.
 1: Greatly contaminated.
 2: A little greatly contaminated
 3: Contaminated.
 4: Little contaminated.
 5: Not contaminated at all.

(5) Light transmittance:
 Transmittance of light with a wavelength of 900 nm was measured.

Figure 4:
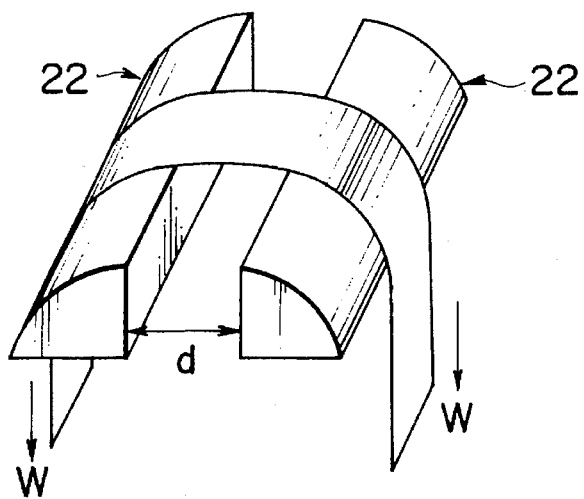
FIG. 4 illustrates a manner by which surface specific resistance is measured.

(6) Surface specific resistance:
 As shown in FIG. 4, two rod-like metal electrodes 22 each having a quartered-circular cross section of about 1 cm in radius were set apart at a distance d (12.7 mm), and a tape 21 was placed on these electrodes in such a way that its magnetic surface came into contact therewith. Weights each having a weight w (160 g) were hung from both ends, respectively, of the tape. Using an insulation resistance tester, a measurement voltage of a direct current of 500±50 V was applied to these electrodes to measure resistance values, and resulting values were expressed as surface specific resistance. The measurement was carried out after samples were left to stand for 24 hours in an atmosphere of 30% RH.

TABLE 1

| | Example 1 | | Example 2 | | Example 3 | | Example 4 | | Example 5 | |
|---|---|---|---|---|---|---|---|---|---|---|
| | Upper layer | Lower layer | Upper layer | Lower layer | Upper layer | Lower layer | Upper layer | Lower layer | Upper layer | Lower layer |
| Layer thickness (μm) | 0.5 | 2.0 | 0.5 | 2.0 | 0.5 | 2.0 | 0.5 | 2.0 | 0.5 | 2.0 |
| Magnetic powder (pbw) | Co—FeO* (100) | Co—FeO* (100) | Co—FeO* (100) | Co—FeO* (100) | Co—FeO* (100) | Co—FeO* (100) | Co—FeO* (100) | Co—FeO* (100) | Co—FeO* (100) | Co—FeO* (100) |
| Hc(Oe)/BET(m²/g) | 750/45 | 650/35 | 750/45 | 650/35 | 750/45 | 650/35 | 750/45 | 650/35 | 750/45 | 650/35 |
| Major axis (μm) | 0.20 | 0.26 | 0.20 | 0.26 | 0.20 | 0.26 | 0.20 | 0.26 | 0.20 | 0.26 |
| Axis ratio | 8 | 10.4 | 8 | 10.4 | 8 | 10.4 | 8 | 10.4 | 8 | 10.4 |
| $Fe^{2+}/Fe^{3+}$ | 0.08 | 0.41 | 0.08 | 0.32 | 0.08 | 0.22 | 0.08 | 0.13 | 0.08 | 0.45 |
| Binder (a) PVC resin MR110 (pbw) | 30 | 20 | 30 | 20 | 30 | 20 | 30 | 20 | 30 | 20 |
| Binder (b) Polyurethane UR8300 (pbw) | 20 | 30 | 20 | 30 | 20 | 30 | 20 | 30 | 20 | 30 |
| Binder (c) Polyisocyanate Colonate L (pbw) | 10 | 10 | 10 | 10 | 10 | 10 | 10 | 10 | 10 | 10 |
| Polyurethane Mw/Tg | 40,000/+20° C. | 40,000/+20° C. | 40,000/+20° C. | 40,000/+20° C. | 40,000/+20° C. | 40,000/+20° C. | 40,000/+20° C. | 40,000/+20° C. | 40,000/+20° C. | 40,000/+20° C. |
| Abrasive (pbw) | Alumina (8) | Alumina (0) | Alumina (8) | Alumina (0) | Alumina (8) | Alumina (0) | Alumina (8) | Alumina (0) | Alumina (8) | Alumina (0) |
| Av. par. diam. (μm) | 0.3 | 0.3 | 0.3 | 0.3 | 0.3 | 0.3 | 0.3 | 0.3 | 0.3 | 0.3 |
| Carbon black (pbw) | 0.2 | 5 | 0.2 | 5 | 0.2 | 5 | 0.2 | 5 | 0.2 | 5 |
| Av. par. diam. (μm) | 40 | 20 | 40 | 20 | 40 | 20 | 40 | 20 | 40 | 20 |
| Myristic acid (pbw) | 0.8 | 0.5 | 0.8 | 0.5 | 0.8 | 0.5 | 0.8 | 0.5 | 0.8 | 0.5 |
| Stearic acid (pbw) | 0.8 | 0.5 | 0.8 | 0.5 | 0.8 | 0.5 | 0.8 | 0.5 | 0.8 | 0.5 |
| Butyl stearate (pbw) | 1.0 | 1.0 | 1.0 | 1.0 | 1.0 | 1.0 | 1.0 | 1.0 | 1.0 | 1.0 |
| Cyclohexanone (pbw) | Appropriate amt. | Appropriate amt. | Appropriate amt. | Appropriate amt. | Appropriate amt. | Appropriate amt. | Appropriate amt. | Appropriate amt. | Appropriate amt. | Appropriate amt. |
| MEK (pbw) | Appropriate amt. | Appropriate amt. | Appropriate amt. | Appropriate amt. | Appropriate amt. | Appropriate amt. | Appropriate amt. | Appropriate amt. | Appropriate amt. | Appropriate amt. |
| Toluene (pbw) | Appropriate amt. | Appropriate amt. | Appropriate amt. | Appropriate amt. | Appropriate amt. | Appropriate amt. | Appropriate amt. | Appropriate amt. | Appropriate amt. | Appropriate amt. |
| Number of protuberances on back surface (/mm²) | | 200,000 | | 200,000 | | 200,000 | | 200,000 | | 200,000 |
| Runnability | | −1.0 | | −1.2 | | −1.3 | | −1.5 | | −1.6 |
| Roll contamination | | 5 | | 5 | | 5 | | 5 | | 4 |
| RF output (dB) | | +3.0 | | +2.9 | | +3.1 | | +3.3 | | +3.0 |
| Chroma output (dB) | | +3.0 | | +2.9 | | +2.8 | | +3.1 | | +3.1 |
| Light transmittance (%) | | 0.03 | | 0.10 | | 0.35 | | 0.05 | | 0.02 |
| Surface specific resistance (Ω/sq) | | 3 × 10⁸ | | 3.5 × 10⁸ | | 4 × 10⁸ | | 3 × 10⁸ | | 4 × 10⁸ |

| | Example 6 | | Example 7 | | Example 8 | | Example 9 | | Comparative Example 1 | |
|---|---|---|---|---|---|---|---|---|---|---|
| | Upper layer | Lower layer | Upper layer | Lower layer | Upper layer | Lower layer | Upper layer | Lower layer | Upper layer | Lower layer |
| Layer thickness (μm) | 0.5 | 2.0 | 0.5 | 2.0 | 0.5 | 2.0 | 0.5 | 2.0 | 0.5 | 2.0 |
| Magnetic powder (pbw) | Co—FeO* (100) | Co—FeO* (100) | Co—FeO* (100) | Co—FeO* (100) | Co—FeO* (100) | Co—FeO* (100) | Co—FeO* (100) | Co—FeO* (100) | Co—FeO* (100) | Co—FeO* (100) |
| Hc(Oe)/BET(m²/g) | 750/45 | 650/35 | 750/45 | 650/35 | 750/45 | 650/35 | 750/45 | 650/35 | 750/45 | 650/35 |
| Major axis (μm) | 0.20 | 0.26 | 0.20 | 0.26 | 0.20 | 0.26 | 0.20 | 0.26 | 0.20 | 0.26 |
| Axis ratio | 8 | 10.4 | 8 | 10.4 | 8 | 10.4 | 8 | 10.4 | 8 | 10.4 |

TABLE 1-continued

| | | | | | | | | |
|---|---|---|---|---|---|---|---|---|
| Fe²⁺/Fe³⁺ | 0.08 | 0.32 | 0.08 | 0.32 | 0.08 | 0.22 | 0.08 | 0.50 |
| Binder (a) (pbw) | PVC resin MR110 (30) | PVC resin MR110 (20) | PVC resin MR110 (30) | PVC resin MR110 (20) | PVC resin MR110 (30) | PVC resin MR110 (30) | PVC resin MR110 (30) | PVC resin MR110 (20) |
| Binder (b) (pbw) | Polyurethane UR8300 (20) | Polyurethane UR8300 (30) | Polyurethane UR8300 (20) | Polyurethane UR8300 (30) | Polyurethane UR8300 (20) | Polyurethane UR8300 (20) | Polyurethane UR8300 (20) | Polyurethane UR8300 (30) |
| Binder (c) (pbw) | Polyisocyanate Colonate L (10) | Polyisocyanate Colonate L (10) | Polyisocyanate Colonate L (10) | Polyisocyanate Colonate L (10) | Polyisocyanate Colonate L (10) | Polyisocyanate Colonate L (10) | Polyisocyanate Colonate L (10) | Polyisocyanate Colonate L (10) |
| Polyurethane Mw/Tg | 40,000/+20°C | 40,000/+20°C | 40,000/+20°C | 40,000/+20°C | 40,000/+20°C | 40,000/+20°C | 40,000/+20°C | 40,000/+20°C |
| Abrasive (pbw) | Alumina (8) | Alumina (0) | Alumina (8) | Alumina (0) | Alumina (8) | Alumina (8) | Alumina (8) | Alumina (0) |
| Av. par. diam. (μm) | 0.3 | 0.3 | 0.3 | 0.3 | 0.3 | 0.3 | 0.3 | 0.3 |
| Carbon black (pbw) | 0.2 | 5 | 0.2 | 5 | 0.2 | 0.2 | 0.2 | 5 |
| Av. par. diam. (μm) | 40 | 20 | 40 | 20 | 40 | 40 | 40 | 20 |
| Mystic acid (pbw) | 0.8 | 0.5 | 0.8 | 0.5 | 0.8 | 0.8 | 0.8 | 0.5 |
| Stearic acid (pbw) | 0.8 | 0.5 | 0.8 | 0.5 | 0.8 | 0.8 | 0.8 | 0.5 |
| Butyl stearate (pbw) | 1.0 | 1.0 | 1.0 | 1.0 | 1.0 | 1.0 | 1.0 | 1.0 |
| Cyclohexanone (pbw) | Appropriate amt. | Appropriate amt. | Appropriate amt. | Appropriate amt. | Appropriate amt. | Appropriate amt. | Appropriate amt. | Appropriate amt. |
| MEK (pbw) | Appropriate amt. | Appropriate amt. | Appropriate amt. | Appropriate amt. | Appropriate amt. | Appropriate amt. | Appropriate amt. | Appropriate amt. |
| Toluene (pbw) | Appropriate amt. | Appropriate amt. | Appropriate amt. | Appropriate amt. | Appropriate amt. | Appropriate amt. | Appropriate amt. | Appropriate amt. |
| Number of protuberances on back surface (/mm²) | 200,000 | | 100,000 | | 3,000,000 | 200,000 | 200,000 | |
| Runnability | -1.4 | | -1.5 | | -1.6 | -1.4 | -2.5 | |
| Roll contamination | 4 | | 4 | | 4 | 5 | 1 | |
| RF output (dB) | +2.9 | | +2.9 | | +2.8 | +2.9 | -1.2 | |
| Chroma output (dB) | +2.8 | | +3.1 | | +3.1 | +3.1 | +0.5 | |
| Light transmittance (%) | 0.09 | | 0.10 | | 0.10 | 0.20 | 0.01 | |
| Surface specific resistance (Ω/sq) | 3 × 10⁸ | | 3 × 10⁸ | | 3 × 10⁸ | 1 × 10⁸ | 9 × 10⁷ | |

| | Comparative Example 1 | | Comparative Example 2 | | Comparative Example 3 | | Comparative Example 4 | |
|---|---|---|---|---|---|---|---|---|
| | Upper layer | Lower layer | Upper layer | Lower layer | Upper layer | Lower layer | Upper layer | Lower layer |
| Layer thickness (μm) | 0.5 | 2.0 | 0.5 | 2.0 | 0.5 | 2.0 | 0.5 | 2.0 |
| Magnetic powder (pbw) | Co—FeO* (100) | Co—FeO* (100) | Co—FeO* (100) | Co—FeO* (100) | Co—FeO* (100) | Co—FeO* (100) | Co—FeO* (100) | Co—FeO* (100) |
| Hc(Oe)/BET(m²/g) | 750/45 | 650/35 | 750/45 | 650/35 | 750/45 | 650/35 | 750/45 | 650/35 |
| Major axis (μm) | 0.20 | 0.26 | 0.20 | 0.26 | 0.20 | 0.26 | 0.20 | 0.26 |
| Axis ratio | 8 | 10.4 | 8 | 10.4 | 8 | 10.4 | 8 | 10.4 |
| Fe²⁺/Fe³⁺ | 0.08 | 0.32 | 0.08 | 0.32 | 0.08 | 0.32 | 0.08 | 0.32 |
| Binder (a) (pbw) | PVC resin MR110 (30) | PVC resin MR110 (20) | PVC resin MR110 (30) | PVC resin MR110 (20) | PVC resin MR110 (30) | PVC resin MR110 (20) | PVC resin MR110 (30) | PVC resin MR110 (20) |
| Binder (b) (pbw) | Polyurethane UR8300 (20) | Polyurethane UR8300 (30) | Polyurethane UR8300 (20) | Polyurethane UR8300 (30) | Polyurethane UR8300 (20) | Polyurethane UR8300 (30) | Polyurethane UR8300 (20) | Polyurethane UR8300 (30) |
| Binder (c) (pbw) | Polyisocyanate Colonate L (10) | Polyisocyanate Colonate L (10) | Polyisocyanate Colonate L (10) | Polyisocyanate Colonate L (10) | Polyisocyanate Colonate L (10) | Polyisocyanate Colonate L (10) | Polyisocyanate Colonate L (10) | Polyisocyanate Colonate L (10) |
| Polyurethane Mw/Tg | 40,000/+20°C | 40,000/+20°C | 40,000/+20°C | 40,000/+20°C | 40,000/+20°C | 40,000/+20°C | 40,000/+20°C | 40,000/+20°C |
| Abrasive (pbw) | Alumina (8) | Alumina (0) | Alumina (8) | Alumina (0) | Alumina (8) | Alumina (0) | Alumina (8) | Alumina (0) |
| Av. par. diam. (μm) | 0.3 | 0.3 | 0.3 | 0.3 | 0.3 | 0.3 | 0.3 | 0.3 |
| Carbon black (pbw) | 0.2 | 5 | 0.2 | 5 | 0.2 | 5 | 0.2 | 5 |

TABLE 1-continued

| | | | | | | |
|---|---|---|---|---|---|---|
| Av. par. diam. (μm) | 40 | 20 | 40 | 20 | 40 | 20 |
| Myristic acid (pbw) | 0.8 | 0.5 | 0.8 | 0.5 | 0.8 | 0.5 |
| Stearic acid (pbw) | 0.8 | 0.5 | 0.8 | 0.5 | 0.8 | 0.5 |
| Butyl stearate (pbw) | 1.0 | 1.0 | 1.0 | 1.0 | 1.0 | 1.0 |
| Cyclohexanone (pbw) | Appropriate amt. | Appropriate amt. | Appropriate amt. | Appropriate amt. | Appropriate amt. | Appropriate amt. |
| MEK (pbw) | Appropriate amt. | Appropriate amt. | Appropriate amt. | Appropriate amt. | Appropriate amt. | Appropriate amt. |
| Toluene (pbw) | Appropriate amt. | Appropriate amt. | Appropriate amt. | Appropriate amt. | Appropriate amt. | Appropriate amt. |
| Number of protuberances on back surface (/mm$^2$) | | 200,000 | | 20,000 | | 6,000,000 |
| Runnability | | −2.8 | | −3.0 | | −4.5 |
| Roll contamination | | 2 | | 1 | | 1 |
| RF output (dB) | | +0.5 | | +0.3 | | +1.0 |
| Chrome output (dB) | | −0.3 | | +0.1 | | +0.5 |
| Light transmittance (%) | | 1.50 | | 0.10 | | 0.10 |
| Surface specific resistance (Ω/sq) | | 9 × 10$^8$ | | 3 × 10$^8$ | | 3 × 10$^8$ |

*Co—FeO = Co-containing iron oxide

It is evident from the foregoing results that all the electromagnetic conversion characteristics, Runnability, prevention of roll contamination, light-shading properties and surface specific resistance are improved when in accordance with the present invention the $Fe^{2+}/Fe^{3+}$ of the magnetic powder used in the lower layer or upper layer is controlled to be 0.13 to 0.45 and also the number of the protuberances on the back surface of a base film is set to be 100,000 to 4,000,000/mm².

Next, the magnetic layer was changed to be comprised of three layers as shown in the layers 2, 5 and 6 in FIG. 2, and performances were evaluated in the same manner as in the above to obtain the results as shown in Table 2. It is evident from the results that like the case of the two-layer magnetic layers, sufficient performances have been achieved when the constitution of the present invention is taken.

TABLE 2

|  | Example 10 | | | Comparative Example 5 | | |
| --- | --- | --- | --- | --- | --- | --- |
|  | Upper layer | Intermediate layer | Lower layer | Upper layer | Intermediate layer | Lower layer |
| Layer thickness (μm) | 0.3 | 0.3 | 2.0 | 0.3 | 0.3 | 2.0 |
| Magnetic powder (pbw) | Ex.1*(100) | Ex.1*(100) | Ex.1*(100) | Ex.1*(100) | Ex.1*(100) | Ex.1*(100) |
| Hc(Oe)/BET(m²/g) | 750/45 | 700/45 | 650/35 | 750/45 | 700/45 | 650/35 |
| Major axis (μm) | 0.20 | 0.20 | 0.26 | 0.20 | 0.20 | 0.26 |
| Axis ratio | 8 | 8 | 10.4 | 8 | 8 | 10.4 |
| $Fe^{2+}/Fe^{3+}$ | 0.08 | 0.32 | 0.32 | 0.08 | 0.08 | 0.50 |
| Binder (a) (pbw) | Ex.1* (30) | Ex.1* (20) | Ex.1* (20) | Ex.1* (30) | Ex.1* (20) | Ex.1* (20) |
| Binder (b) (pbw) | Ex.1* (20) | Ex.1* (30) | Ex.1* (30) | Ex.1* (20) | Ex.1* (30) | Ex.1* (30) |
| Binder (c) (pbw) | Ex.1* (10) | Ex.1* (10) | Ex.1* (10) | Ex.1* (10) | Ex.1* (10) | Ex.1* (10) |
| Polyurethane Mw/Tg | 40,000/+20° C. | 40,000/+20° C. | 40,000/+20° C. | 40,000/+20° C. | 40,000/+20° C. | 40,000/+20° C. |
| Abrasive (pbw) | Ex.1* (8) | Ex.1* (0) | Ex.1* (0) | Ex.1* (0) | Ex.1*(10) | Ex.1* (0) |
| Av. par. diam. (μm) | 0.3 | 0.3 | 0.3 | 0.3 | 0.3 | 0.3 |
| Carbon black (pbw) | 0.2 | 5 | 5 | 0.2 | 5 | 5 |
| Av. par. diam. (μm) | 40 | 20 | 20 | 40 | 20 | 20 |
| Myristic acid (pbw) | 0.8 | 0.5 | 0.5 | 0.8 | 0.5 | 0.5 |
| Stearic acid (pbw) | 0.8 | 0.5 | 0.5 | 0.8 | 0.5 | 0.5 |
| Butyl stearate (pbw) | 1.0 | 1.0 | 1.0 | 1.0 | 1.0 | 1.0 |
| Cyclohexanone (pbw) | Ex.1* | Ex.1* | Ex.1* | Ex.1* | Ex.1* | Ex.1* |
| MEK (pbw) | Ex.1* | Ex.1* | Ex.1* | Ex.1* | Ex.1* | Ex.1* |
| Toluene (pbw) | Ex.1* | Ex.1* | Ex.1* | Ex.1* | Ex.1* | Ex.1* |
| Number of protuberances on back surface (/mm²) |  | 200,000 |  |  | 200,000 |  |
| Runnability |  | −1.2 |  |  | −2.9 |  |
| Roll contamination |  | 5 |  |  | 1 |  |
| RF output (dB) |  | +3.5 |  |  | +2.5 |  |
| Chroma output (dB) |  | +3.6 |  |  | +2.6 |  |
| Light transmittance (%) |  | 0.10 |  |  | 0.01 |  |
| Surface specific resistance (Ω/sq) |  | 3 × 10⁸ |  |  | 6 × 10⁸ |  |

*Ex.1 = The same as Example 1

What is claimed is:

1. A magnetic recording medium comprising a non-magnetic support having a lower magnetic layer and an uppermost magnetic layer provided on a surface of said support in said respective order, wherein said lower magnetic layer comprises a vinyl chloride copolymer containing a member selected from the group consisting of a —SO₃M group, a —COOM group and a —PO(OM')₂ group, in which M is hydrogen or an alkali metal and M' is an alkali metal or a hydrocarbon radical, a first magnetic material comprising a first magnetic iron oxide in which the atomic number ratio of a divalent iron component $Fe^{2+}$ to a trivalent iron component $Fe^{3+}$ is $0.13 \leq Fe^{2+}/Fe^{3+} \leq 0.45$, and a lubricant;

wherein said uppermost magnetic layer comprises a vinyl chloride copolymer containing a member selected from the group consisting of a —SO₃M group, a —COOM group and a —PO(OM')₂ group, in which M is hydrogen or an alkali metal and M' is an alkali metal or a hydrocarbon radical, a second magnetic material comprising a second magnetic iron oxide in which the atomic number ratio of a divalent iron component $Fe^{2+}$ to a trivalent iron component $Fe^{3+}$ is $0.001 \leq Fe^{2+}/Fe^{3+} \leq 0.1$, and a lubricant; and wherein said non-magnetic support has from 100,000/mm² to 4,000,000/mm² of protuberances on a surface opposite to the surface on which said lower and uppermost magnetic layers are provided.

2. A recording medium of claim 1, wherein said ratio of divalent iron component to trivalent iron component in magnetic iron oxide is $0.20 \leq Fe^{2+}/Fe^{3+} \leq 0.41$ in atomic number ratio.

3. A recording medium of claim 1, wherein said ratio of divalent iron component to trivalent iron component in magnetic type iron oxide is $0.25 \leq Fe^{2+}/Fe^{3+} \leq 0.38$ in atomic number ratio.

4. A recording medium of claim 1, wherein said magnetic iron oxide having the ratio of $Fe^{2+}/Fe^{3+}$ of from 0.13 to 0.45 is a cobalt-containing magnetic iron oxide.

5. A recording medium of claim 1, wherein the magnetic material contained in a magnetic layer other than said lower layer and said uppermost layer is a magnetic material selected from the group consisting of a $\gamma$—$FE_2O_3$, a Co-containing $\gamma$—$Fe_2O_3$, FE, Ni, Co, an Fe—Ni—Co alloy, an Fe—Ni alloy, an Fe—Al alloy, an Fe—Al—Ni alloy, an Fe—Al—Co alloy, an Fe—Mn—Zn alloy, an Fe—Ni—Zn alloy, an Fe—Al—Ni—Co alloy, an Fe—Al—Ni—Cr alloy, an Fe—Al—Co—Cr alloy, an Fe—Co—Ni—Cr alloy, an Fe—Co—Ni—P alloy and a Co—Ni alloy.

6. A recording medium of claim 1, wherein the number of said protuberances provided on said opposite surface of said support is within the range of from $150,000/mm^2$ to $3,000,000/mm^2$.

7. A recording medium of claim 1, wherein the number of said protuberances provided on said opposite surface of said support is within the range of from $150,000/mm^2$ to $1,000,000/mm^2$.

8. A recording medium of claim 1, wherein the average height of said proberances is within the range of from 10 nm to 300 nm.

9. A recording medium of claim 1, wherein the average height of said proberances is within the range of from 20 nm to 200 nm.

* * * * *